(12) United States Patent
Juan et al.

(10) Patent No.: US 11,886,488 B2
(45) Date of Patent: Jan. 30, 2024

(54) SYSTEM AND METHOD FOR LEARNING SCENE EMBEDDINGS VIA VISUAL SEMANTICS AND APPLICATION THEREOF

(71) Applicant: YAHOO ASSETS LLC, Dulles, VA (US)

(72) Inventors: Paloma de Juan, New York, NY (US); Aasish Pappu, New York, NY (US)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 17/971,225

(22) Filed: Oct. 21, 2022

(65) Prior Publication Data
US 2023/0041472 A1    Feb. 9, 2023

Related U.S. Application Data

(63) Continuation of application No. 16/142,155, filed on Sep. 26, 2018, now Pat. No. 11,481,575.

(51) Int. Cl.
| | |
|---|---|
| *G06F 16/532* | (2019.01) |
| *G06F 16/583* | (2019.01) |
| *G06F 18/21* | (2023.01) |
| *G06F 18/231* | (2023.01) |
| *G06F 18/28* | (2023.01) |
| *G06N 20/00* | (2019.01) |
| *G06N 3/08* | (2023.01) |

(Continued)

(52) U.S. Cl.
CPC ........ *G06F 16/532* (2019.01); *G06F 16/5838* (2019.01); *G06F 18/217* (2023.01); *G06F 18/28* (2023.01); *G06N 3/08* (2013.01); *G06N 20/00* (2019.01); *G06V 10/761* (2022.01); *G06V 10/7625* (2022.01); *G06V 10/82* (2022.01); *G06V 20/30* (2022.01); *G06V 20/70* (2022.01); *G06V 30/268* (2022.01); *G06V 30/274* (2022.01)

(58) Field of Classification Search
None
See application file for complete search history.

(56) References Cited

U.S. PATENT DOCUMENTS

| | | | | |
|---|---|---|---|---|
| 7,143,352 | B2 * | 11/2006 | Divakaran | .......... G06F 16/7834 715/721 |
| 8,451,292 | B2 * | 5/2013 | Wang | .................... G11B 27/28 345/619 |

(Continued)

OTHER PUBLICATIONS

Yang et al. "Dense Captioning with Joint Inference and Visual Context," 2017 IEEE Conference on Computer Vision and Pattern Recognition (CVPR), Nov. 9, 2017 (Year: 2017).*

(Continued)

*Primary Examiner* — Soo Shin
(74) *Attorney, Agent, or Firm* — Venable LLP

(57) ABSTRACT

The present teaching relates to method, system, and programming for responding to an image related query. Information related to each of a plurality of images is received, wherein the information represents concepts co-existing in the image. Visual semantics for each of the plurality of images are created based on the information related thereto. Representations of scenes of the plurality of images are obtained via machine learning, based on the visual semantics of the plurality of images, wherein the representations capture concepts associated with the scenes.

20 Claims, 21 Drawing Sheets

(51) Int. Cl.
  *G06V 10/74* (2022.01)
  *G06V 10/762* (2022.01)
  *G06V 10/82* (2022.01)
  *G06V 20/30* (2022.01)
  *G06V 20/70* (2022.01)
  *G06V 30/262* (2022.01)

(56) References Cited

U.S. PATENT DOCUMENTS

| | | | |
|---|---|---|---|
| 9,251,433 B2* | 2/2016 | Cao | G06V 10/7784 |
| 10,198,671 B1* | 2/2019 | Yang | G06V 10/768 |
| 10,353,951 B1* | 7/2019 | Li | G06F 16/435 |

OTHER PUBLICATIONS

Yang et al., "Dense Captioning with Joint Inference and Visual Context," 2017 IEEE Conference on Computer Vision and Pattern Recognition (CVPR), Nov. 9, 2017.

\* cited by examiner

SYSTEM AND METHOD FOR LEARNING SCENE EMBEDDINGS VIA VISUAL SEMANTICS AND APPLICATION THEREOF

CROSS REFERENCE TO RELATED APPLICATION

The present application is a continuation of U.S. patent application Ser. No. 16/142,155, filed Sep. 26, 2018, titled "SYSTEM AND METHOD FOR LEARNING SCENE EMBEDDINGS VIA VISUAL SEMANTICS AND APPLICATION THEREOF", the contents of which are hereby incorporated by reference in its entirety.

BACKGROUND

1. Technical Field

The present teaching generally relates to machine learning. More specifically, the present teaching relates to machine learning of a representation based on data.

2. Technical Background

In the age of the Internet, multimedia information is ubiquitous. People rely on search to obtain what they need. Search can be done for different types of information, including textual and visual. Traditionally, for textual information search, a query is presented as text and used, optionally in combination with other relevant information, to identify relevant documents. For visual information search, a query may be textual or visual. For example, a user may enter text query, e.g., "sunset images," and the query is used to identify images that are labeled as a sunset image. A query for images may also be visual, e.g., an image. For example, a user may submit a sunset image as a visual query and ask for similar images.

Traditional approaches for search relevant images either require that archived images are labeled explicitly as queried or searching for images with similar visual features rely on low level visual features without a sense of the visual semantics involved. Given that, it is in general difficult to retrieve reliably similar images. Thus, there is a need to devise a solution to address this deficiency.

SUMMARY

The teachings disclosed herein relate to methods, systems, and programming for machine learning. More particularly, the present teaching relates to methods, systems, and programming related to machine learning of a representation based on data.

In one example, a method, implemented on a machine having at least one processor, storage, and a communication platform capable of connecting to a network for responding to an image related query is disclosed. The method includes the steps of receiving, via the communication platform, information related to each of a plurality of images, wherein the information represents concepts co-existing in the image; creating visual semantics for each of the plurality of images based on the information related thereto; and obtaining, via machine learning, representations of scenes of the plurality of images based on the visual semantics of the plurality of images, wherein the representations capture concepts associated with the scenes.

In a different example, a system for responding to an image related query is disclosed. The system includes a visual semantics generator implemented by a processor and configured to receive information related to each of a plurality of images, wherein the information represents concepts co-existing in the image, and create visual semantics for each of the plurality of images based on the information related thereto. The system includes an image scene embedding training unit implemented by the processor and configured to obtain, via machine learning, representations of scenes of the plurality of images based on the visual semantics of the plurality of images, wherein the representations capture concepts associated with the scenes.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is disclosed a machine readable and non-transitory medium having information including machine executable instructions stored thereon for responding to an image related query, wherein the information, when read by the machine, causes the machine to perform the steps of of receiving information related to each of a plurality of images, wherein the information represents concepts co-existing in the image; creating visual semantics for each of the plurality of images based on the information related thereto; and obtaining, via machine learning, representations of scenes of the plurality of images based on the visual semantics of the plurality of images, wherein the representations capture concepts associated with the scenes.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details or with different details related to design choices or implementation variations. In other instances, well known methods, procedures, components, and/or hardware/software/firmware have been described at a relatively high-level, without detail, in order to avoid unnecessarily obscuring aspects of the present teachings.

The present disclosure generally relates to systems, methods, medium, and other implementations directed to learning embeddings for visual scenes via visual semantics represented based on collocated annotations of visual objects. Such learned scene embeddings capture relationships of collocate concepts and an abstraction of higher level concept(s) associated with each image scene. Such machine learned embeddings may then be used in responding to visual based queries such as identifying conceptually similar images and/or inferring context of an image based on available collocate image object annotations. In the illustrated embodiments of the present teaching, the related concepts are presented in an online networked operational environment in which the present teaching may be deployed. However, it is understood that the present teaching can be applied to any setting where visual based query is needed. In addition, although the present teaching is presented based on certain exemplary visual images, the concepts of the present teaching can be applied to any types of visual information without limitation.

Figure 1A:
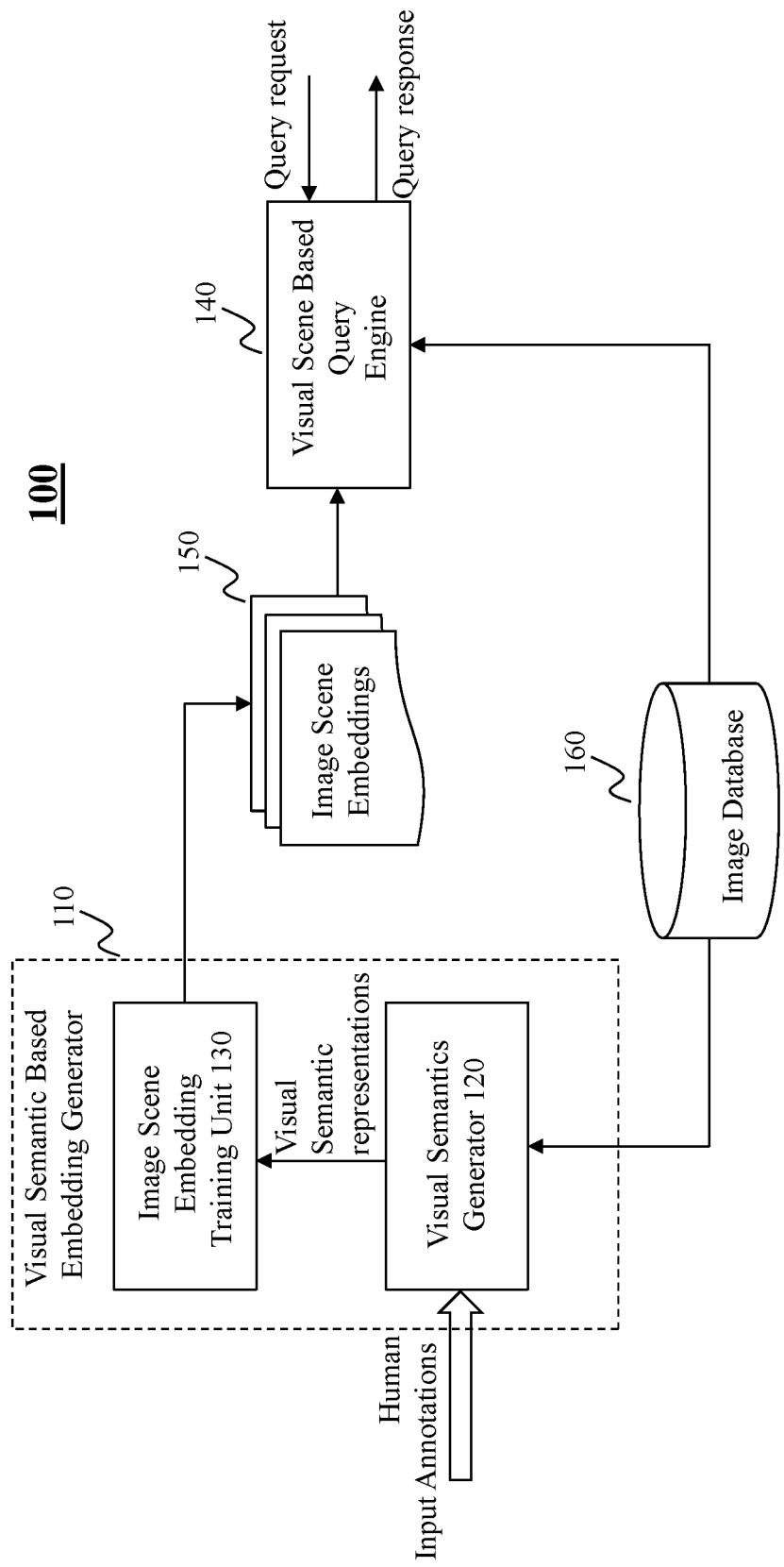
FIG. 1A depicts an exemplary high-level system diagram of an embedding based image query engine, according to an embodiment of the present teaching.

FIG. 1A depicts an exemplary high-level system diagram of an embedding based image query engine 100, according to an embodiment of the present teaching. In this illustrated embodiment, the embedding based image query engine 100 comprises a visual semantic based embedding generator 110 to generate, via machine learning, image scene embeddings 150, and a visual scene based query engine 140 that responds to a visual query request and provides a query response. In the illustrated embodiment, the visual semantic based embedding generator 110 is configured to train scene embeddings based on visual semantics represented based on annotations with respect to a plurality of corresponding training images stored in an image database 160. To obtain visual semantics for the training, the visual semantic based embedding generator 110 includes a visual semantics generator 120 to obtain annotations related to training images and generate visual semantic representations based on such annotations. Such generated visual semantic representations are then fed to an image scene embedding training unit 130 where image scene embeddings are learned and refined.

Figure 1B:
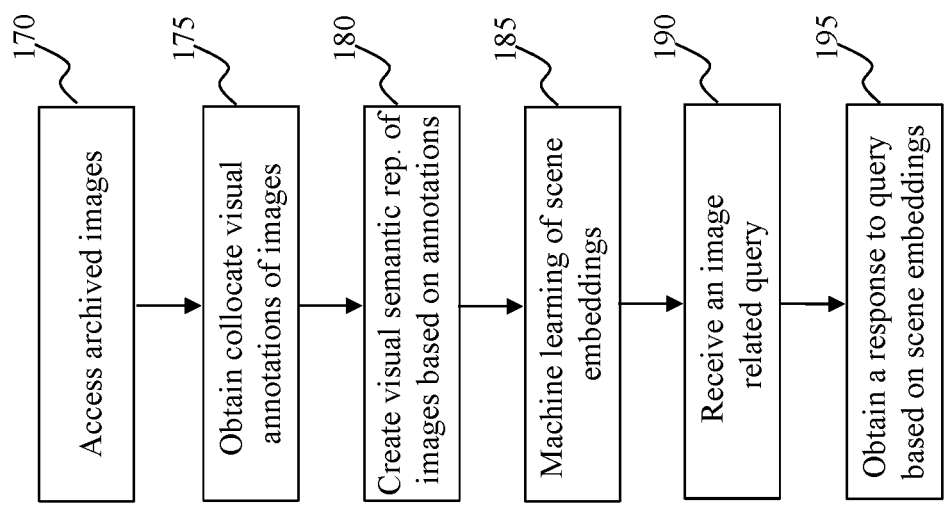
FIG. 1B is a flowchart of an exemplary process of an embedding based image query engine, according to an embodiment of the present teaching.

FIG. 1B is a flowchart of an exemplary process of the embedding based image query engine 100, according to an embodiment of the present teaching. To learn scene embeddings, training data are created first by creating visual semantic representations for images used in training. Archived images are first accessed at 170 to obtain by the visual semantic representation generator 120, at 175, annotations for collocated objects/features present in each of the images. Such annotations may be previously generated and stored together with each of the accessed images. Such annotations may also be generated by the visual semantic representation generator 120 based on either human input annotations, automatically, or semi-automatically. Such obtained annotations for objects/features collocated in each image are then used by the visual semantic representation generator 120 to create, at 180, the visual semantic representation of each of the images.

Once the visual semantic representations for the training images are created, the image scene embedding training unit 130 conducts machine learning, at 185, to devise scene embeddings. Such learned scene embeddings are stored in the storage 150 for future use whenever an image related query is received, at 190, by the visual scene based query engine 140. The query is handled by the visual scene query engine 140 which determines, at 195, a response to the query based on the machine learned scene embeddings stored in 150. Details related to different aspects of the embedding based image query engine 100 are provided herein with references to FIGS. 3-10.

Figure 2A:
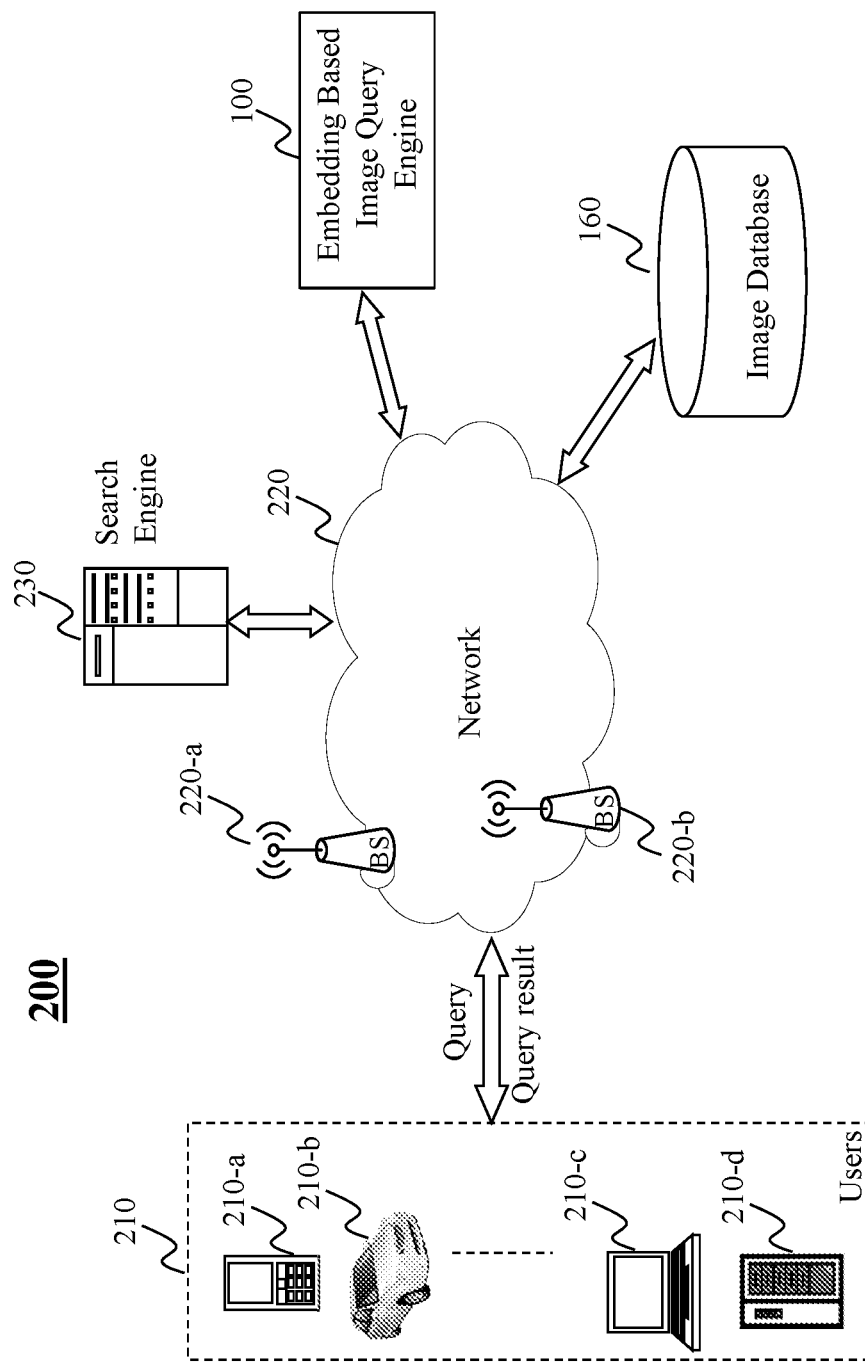
FIGS. 2A-2D depict different operational configurations of an embedding based image query engine, according to different embodiments of the present teaching.

FIGS. 2A-2D depict different operational configurations of the embedding based image query engine 100, according to different embodiments of the present teaching. By an operational configuration of the embedding based image query engine 100, it refers to how the embedding based image query engine 100 is deployed and how it is connected to others. FIG. 2A depicts an operational configuration which includes users 210, a network 220, an exemplary search engine 230, the embedding based image query engine 100, and the image database 160.

In this embodiment, the embedding based image query engine 100 is connected to the network 220 as an, e.g., an independent service engine. That is, the stand-alone embedding based image query engine 100 provides services to any party connected with the network 220 to handle image related queries. For example, an image related query may be from a user 210, from the search engine 230, or any other party such as a publisher (not shown) for, e.g., identifying a conceptually similar images or providing a conceptual context of an image.

Figure 2B:
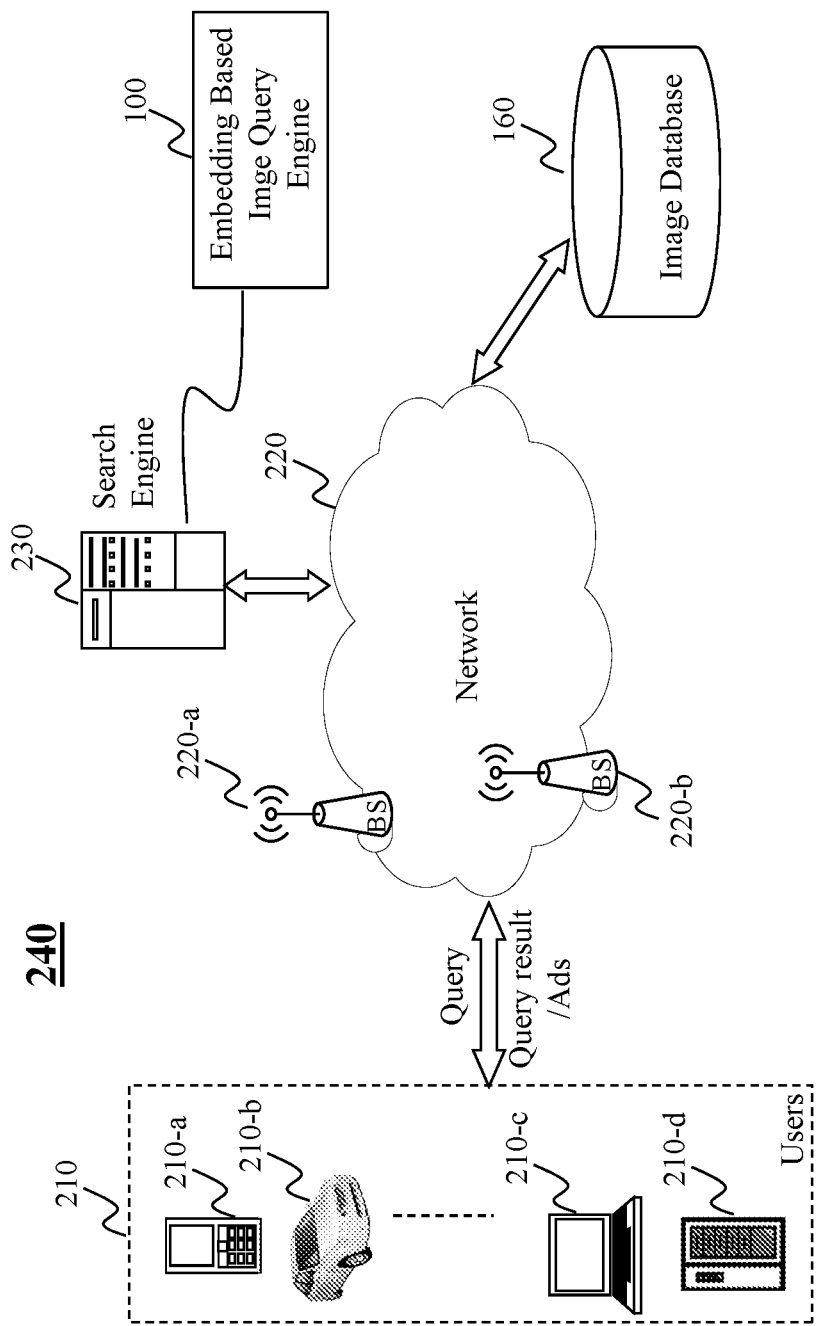

FIG. 2B depicts a different operational configuration in which the embedding based image query engine 100 is deployed as a backend service engine for the search engine 230 to handle image related queries, according to a different embodiment of the present teaching. In this embodiment, the embedding based image query engine 100 is a special module in the backend of the search engine 230. In some variations of this embodiment, when there are multiple search engines (not shown), each may have its own backend module for handling image related queries. In another alternative, multiple search engines may share the same backend embedding based image query engine 100.

Figure 2C:
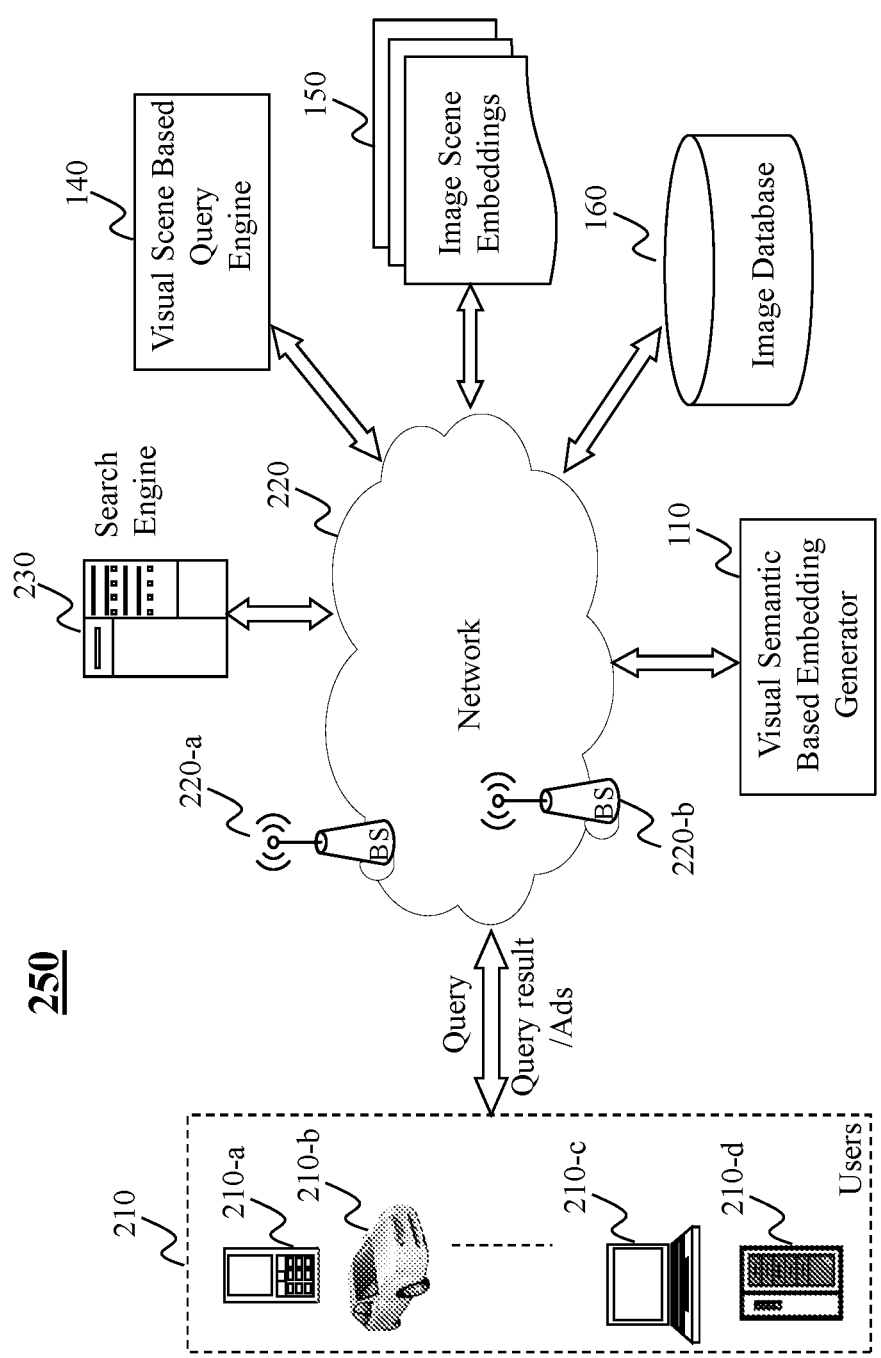
Figure 2D:
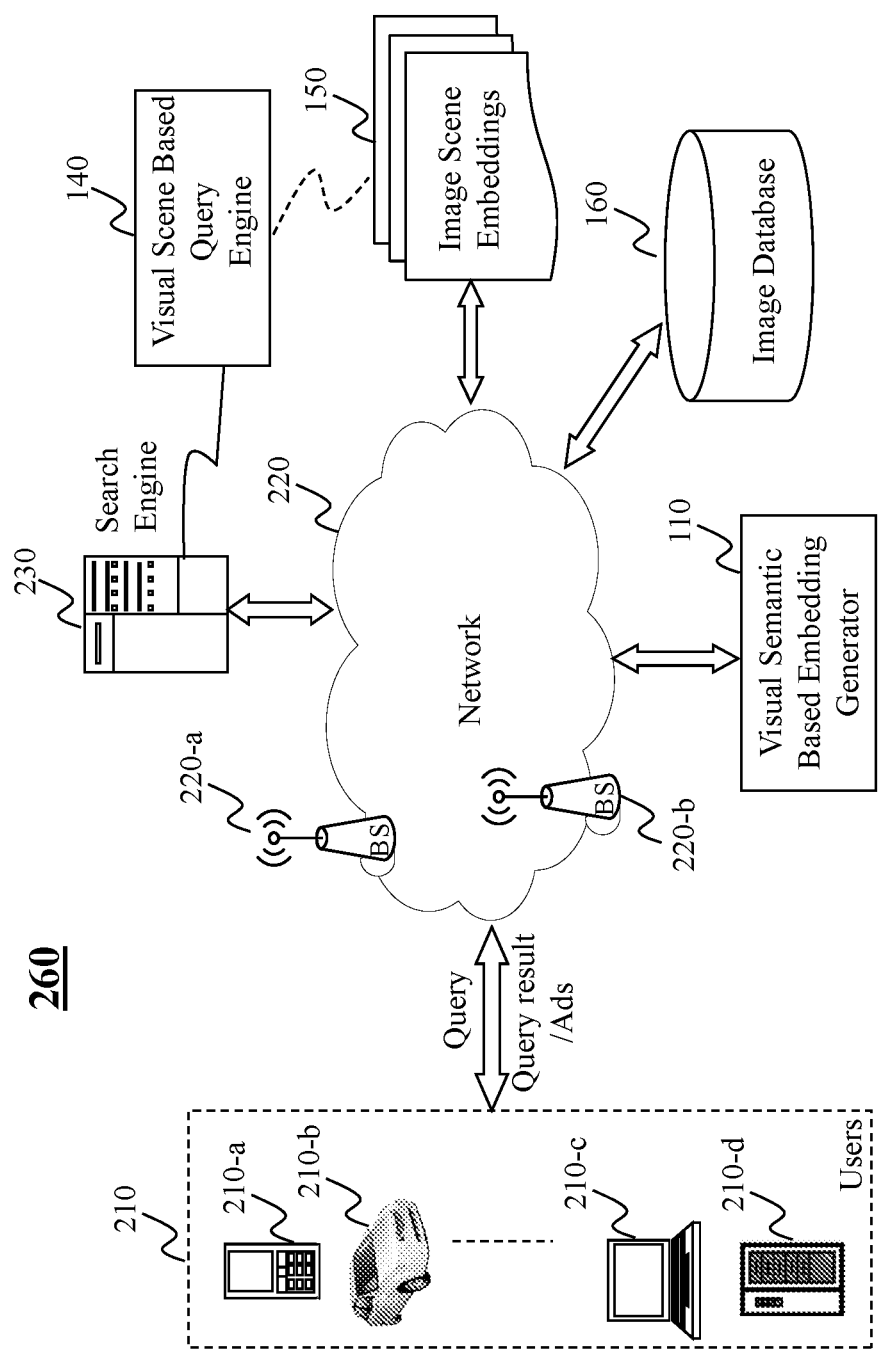

In some embodiments, different components of the embedding based image query engine may be separately deployed to provide more flexible services. FIG. 2C shows an operational configuration in which components of the embedding based image query engine 100 are separately deployed on the network to provide independent services, according to yet another different embodiment of the present teaching. Specifically, in this embodiment, the visual semantic based embedding generator 110 and the visual scene based query engine 140 may be separately deployed on the network so that they each can provide stand-alone services. FIG. 2D shows yet another operational configuration, according to an embodiment of the present teaching. In this configuration, the visual semantic based embedding generator 110 is independently deployed on the network to provide stand-alone services and the visual scene based query engine 140 is connected directly with the search engine 230 as its backend module to support image related query handlings. The image scene embeddings 150, created by the visual semantic based embedding generator 110, may be archived independently on the network so that different parties (search engines or publishers, etc.) may use them for handling image related queries. Alternatively, if a party on the network, such as the search engine 230, requests the visual semantic based embedding generator 110 to create embeddings, such created embeddings may, once generated, be sent to the requesting search engine 230 so that they are archived privately in the backend of the search engine 230 (as shown as dotted connection in FIG. 2D) and used by its backend visual scene based query engine 140 to handle visual related queries. Other additional configurations are also possible and it is understood that those configurations are also within the scope of the present teaching.

In FIGS. 2A-2D, the network 220 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a Bluetooth network, a virtual network, or any combination thereof. The network 220 may also include various network access points (access point 220-a, . . . , 220-b), e.g., wired or wireless access points such as base stations or Internet exchange points (not shown) through which a data source may connect to the network 220 in order to transmit/receive information via the network.

In some embodiments, the network 220 may be an online advertising network or an ad network, which connects the embedding based image query engine 100 or components thereof to/from the search engine 230 or publishers and web sites/mobile applications hosted thereon (not shown) that involve any aspect of image related representation creation and queries in advertisement related services. Functions of an ad network include an aggregation of ad-space supply from the search engine 230 or a publisher, ad supply from some advertisement servers (not shown), and selected content related to advertisement including imagery content. An ad network may be any type of advertising network environments such as a television ad network, a print ad network, an online (Internet) ad network, or a mobile ad network.

A publisher may be a content provider, a search engine, a content portal, or any other sources from which content can be published. A publisher may correspond to an entity, whether an individual, a firm, or an organization, publishing or supplying content, including a blogger, television station, a newspaper issuer, a web page host, a content portal, an online service provider, or a game server. For example, in connection to an online or mobile ad network, a publisher may also be an organization such as USPTO.gov and CNN.com, or a content portal such as YouTube and Yahoo.com, or a content-soliciting/feeding source such as Twitter, Facebook, or blogs. In one example, content sent to a user may be generated or formatted by the publisher 230 based on data provided by or retrieved from the content sources 260.

Users 210 may be of different types such as ones connected to the network via wired or wireless connections via a device such as a desktop, a laptop, a handheld device, a built-in device embedded in a vehicle such as a motor vehicle, or wearable devices (e.g., glasses, wrist watch, etc.). In one embodiment, users 210 may be connected to the network 220 to access and interact with online content with ads (provided by the publisher 230) displayed therewith, via wired or wireless means, through related operating systems and/or interfaces implemented within the relevant user interfaces.

In operation, a request for a service related to embedding and/or use thereof to handle image related queries can be received by the embedding based image query engine 100 or a component thereof. When such a request is to create scene embeddings, source of training data may also be provided. When the request is for handling an image related query, the embedding based image query engine 100 handles the query based on embeddings it created via machine learning and responds to the query based on the embeddings.

Figure 3A:
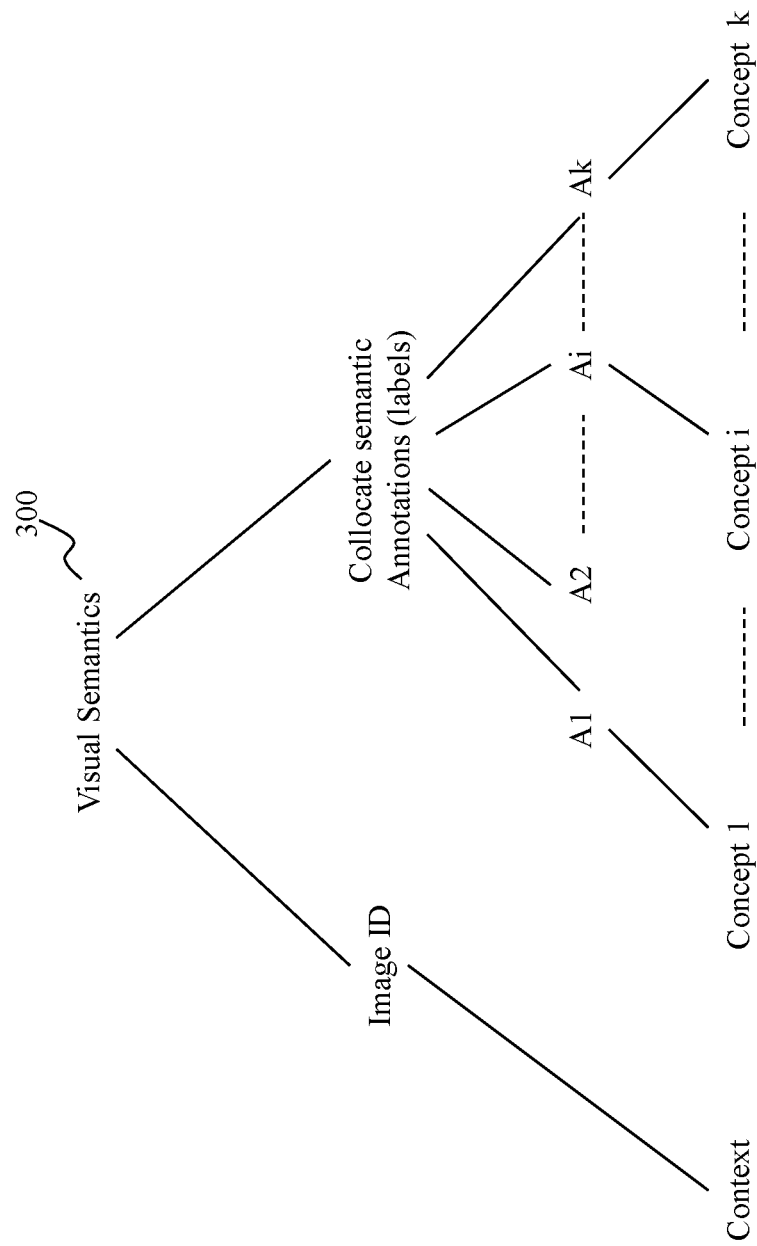
FIG. 3A illustrates an exemplary representation of visual semantics of an image, according to an embodiment of the present teaching.
Figure 3B:
FIG. 3B provides an example image having various detected objects marked each with an annotated concepts.

As discussed herein, embeddings are derived via machine learning based on visual semantics of images used in training. FIG. 3A illustrates an exemplary representation of visual semantics 300 of an image, according to an embodiment of the present teaching. According to this illustrated embodiment, visual semantics 300 of an image is represented by context and collocated annotated concepts. Specifically, in this embodiment, visual semantics of an image is represented by an image ID as context of the visual semantics as well as a series of annotations of the collocated object/features related to the image (A1, A2, . . . , Ai, . . . , Ak), each of which corresponds to a labeled concept (Concept 1, concept 2, . . . , concept i, . . . concept k). FIG. 3B provides a specific example image having various detected objects, each of which is associated with an annotated concepts. As shown, in this image, there are various objects/concepts detected and marked with a bounding box enclosing the object/concepts with annotations. For example, concept is annotated as "person" with specific instances of "person" also annotated, e.g., "conductor," "singer," and "violinist musician;" concept "musical ensemble" is annotated with specific musical instruments also annotated, e.g., "violin fiddle," "music stand," "viola," and "music stand." A larger bounding box encompasses the entire scene is annotated as "orchestra."

Figure 4A:
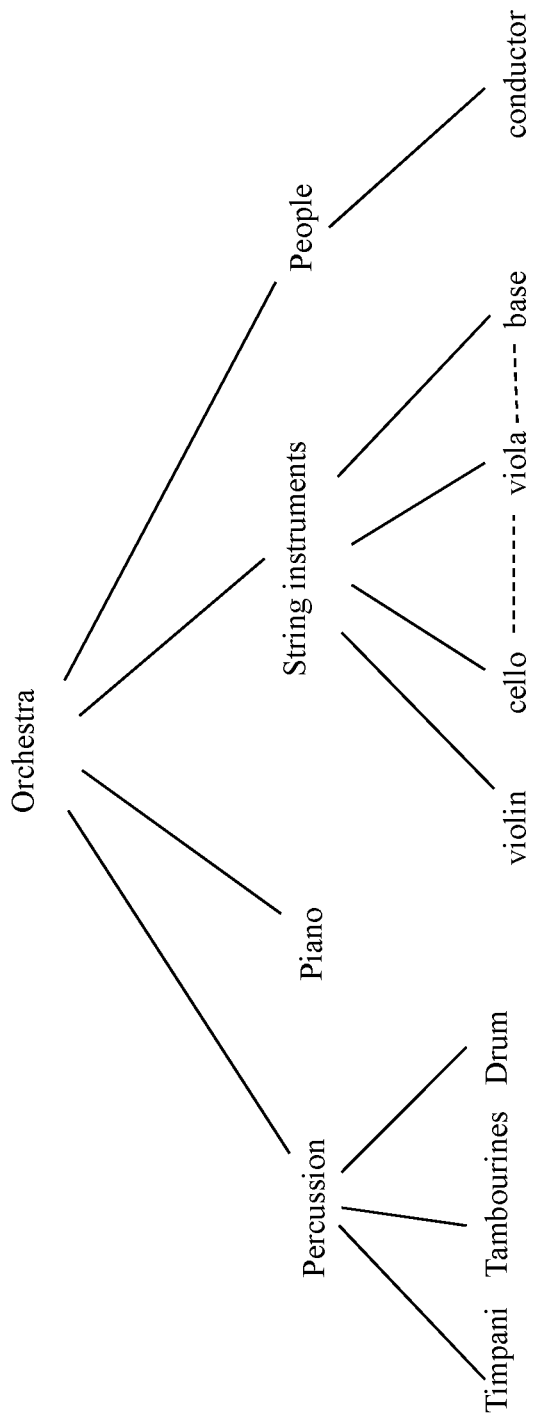
FIG. 4A provide exemplary concept hierarchy.
Figure 4B:
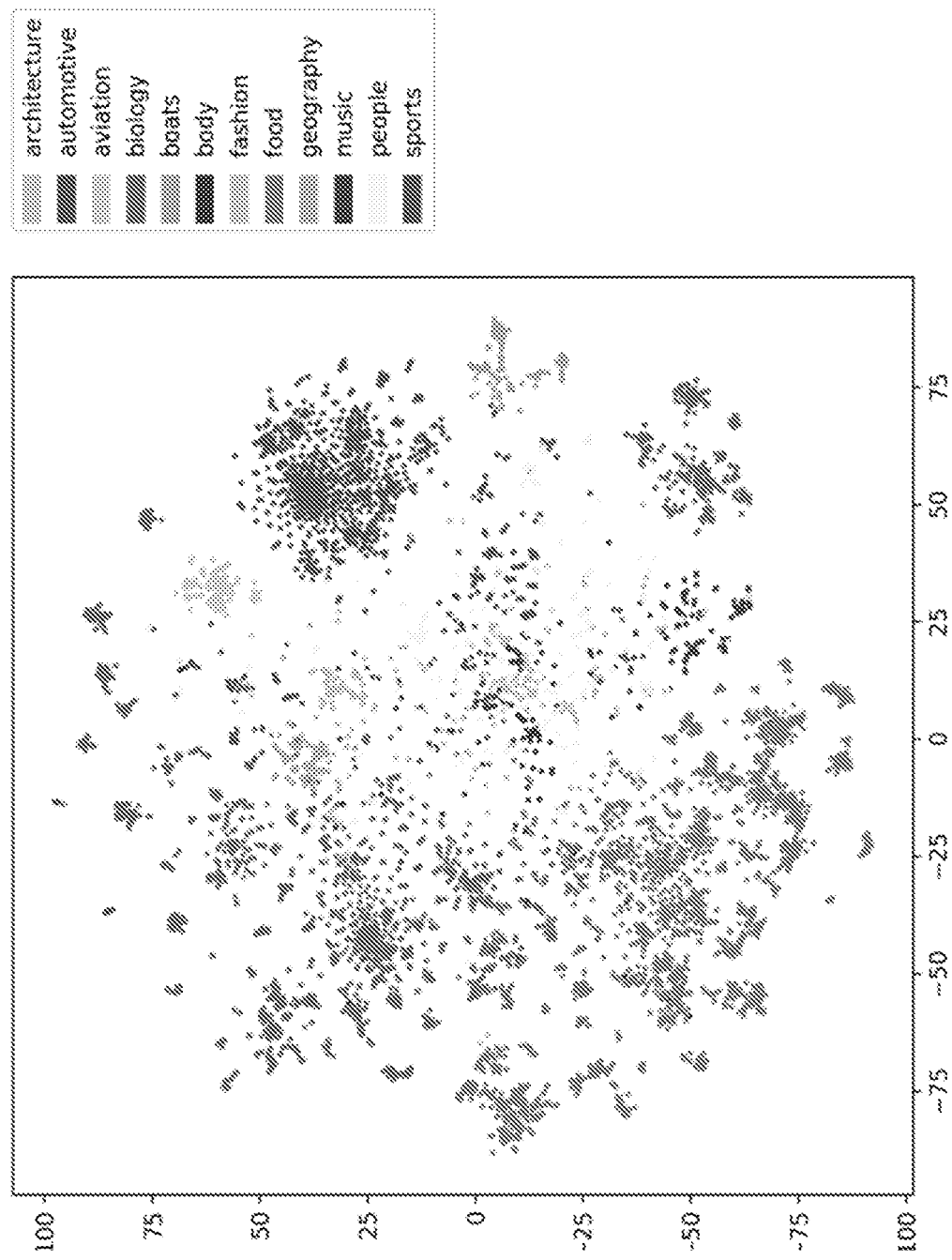
FIG. 4B shows exemplary two dimensional projections of concepts with clusters representing higher levels of concepts.

Concepts co-occurring in the same image scene may form a hierarchy of abstraction. For example, annotation "person" may represent an abstracted concept encompassing concepts "conductor," "bandleader," and "violinist musician." Annotation "musical ensemble" may represent an abstract concept encompassing different instrument/facility in a musical performance such as "violin fiddle," "music stand," and "viola." The annotated concept "orchestra" encompasses almost everything in the image representing an abstract concept of a musical performance of a certain type. FIG. 4A shows an exemplary concept hierarchy related to orchestra, in which the concept of orchestra includes different categories of concepts related thereto such as people, piano, string instruments, percussion, etc., each of which may further includes sub-concepts. What is shown in FIG. 4A is merely illustrative and there may be other ways to relate various concepts associated with concept "orchestra." It is observed that when certain concepts co-occur or collocate in the same image, certain inference may be made about what the image is about. In addition, if one image has certain co-occurring or collocated concepts, other images with similar collocated concepts may be conceptually similar. That is, based on known annotations of collocate concepts in an image, inference may be made as to what this image is conceptually about and such inference may therefore be used to identify other images that are conceptually related. To devise scene embeddings for images is to capture the relationships among different collocate concepts and among concepts of different abstraction levels. FIG. 4B shows exemplary two dimensional projections of concepts. It is shown in FIG. 4B that related concepts are often clustered and each cluster may represent a concept at a higher level of abstraction. For example, a tightly clustered group of projected points in the upper right corner of FIG. 4B represents the concept of automotive with points projected in that cluster representing concepts related to automotive such as cars, trucks, SUVs, etc. and each of such types of automotive may correspond to a sub-cluster within the automotive cluster with points therein corresponding to concepts related thereto. For instance, the center sub-cluster in the automotive cluster may represent concept cars, which further includes concepts such as wheel, tire, window shield, etc. A goal of learning scene embedding is to devise embeddings so that annotations of an image can lead to a representation, created based on the embeddings, that is close to another conceptually similar image. For example, when embeddings are properly learned, annotations of collocated concepts of two orchestra images (even though from different concerts at different locations) will lead to similar representations, which when projected will lead to nearby projected points in the embedding space.

The disclosure presented herein enables, via machine learning, derivation of embeddings for visual scenes that capture relationships among collocated concepts. As compared with the conventional low level image feature (color, texture, etc.) based approaches, the present teaching allows identifying similar images at conceptual level rather than similarities at lower visual feature level.

Figure 5A:
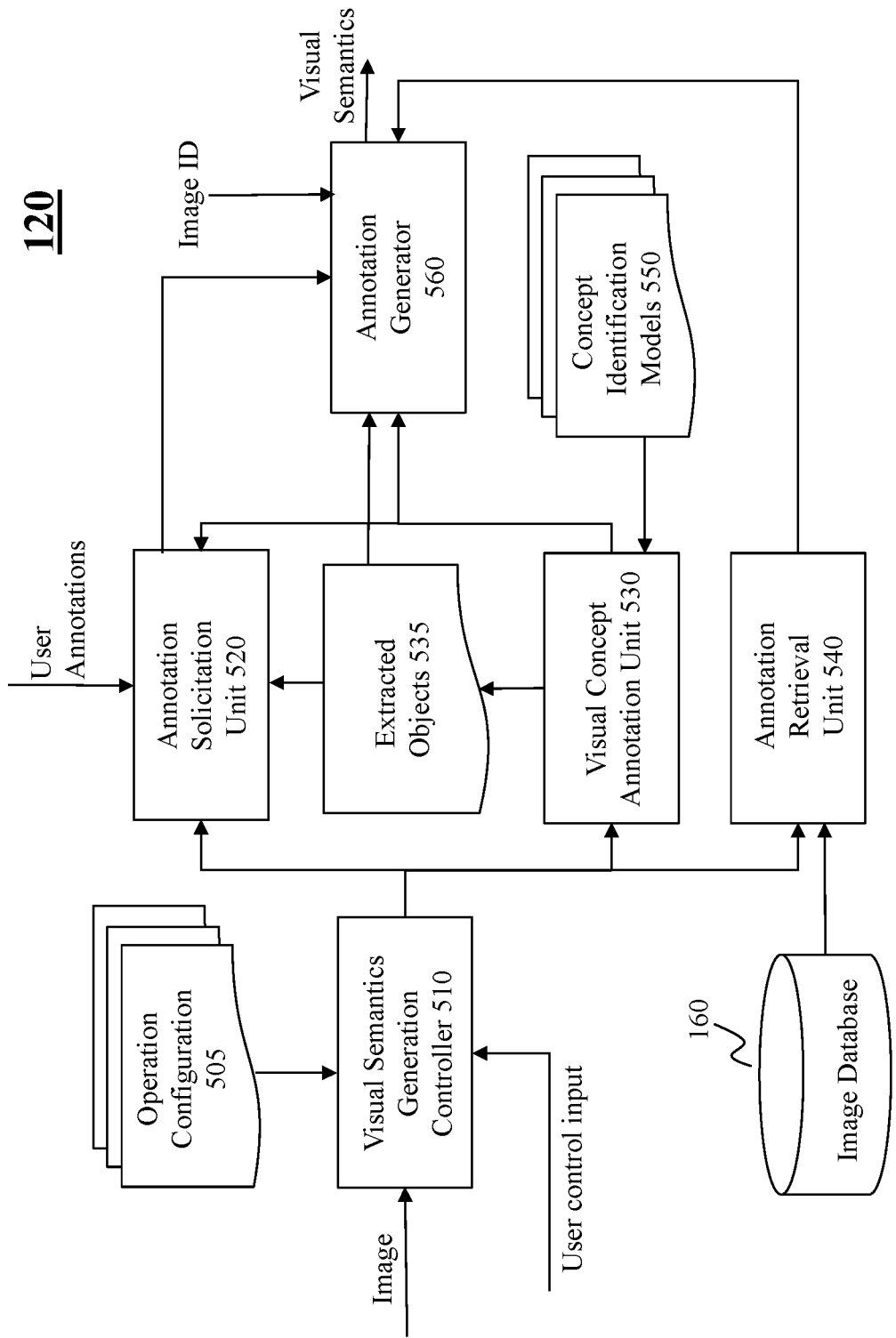
FIG. 5A depicts an exemplary high-level system diagram of a visual semantics generator, according to an embodiment of the present teaching.

FIG. 5A depicts an exemplary high-level system diagram of the visual semantics generator 120, according to an embodiment of the present teaching. As disclosed herein, the training data used to learn scene embeddings are visual semantics (see FIGS. 1A and 1B) and in some embodiments, visual semantics are represented by image identification as context as well as annotations of collocated concepts in images (as shown in FIG. 3A). In this illustrated embodiment, the visual semantics generator 120 comprises a visual semantics generation controller 510, an annotation solicitation unit 520, a visual concept annotation unit 530, an annotation retrieval unit 540, and a visual semantics generator 560. In this embodiment of the implementation, visual semantics are represented by, e.g., a combination of image ID (which provides the context of the visual semantics) and various annotations of concepts that are present in the particular context. Thus, obtaining annotations of concepts co-occurring in the image context needs to be accomplished in order to create visual semantics.

Figure 5B:
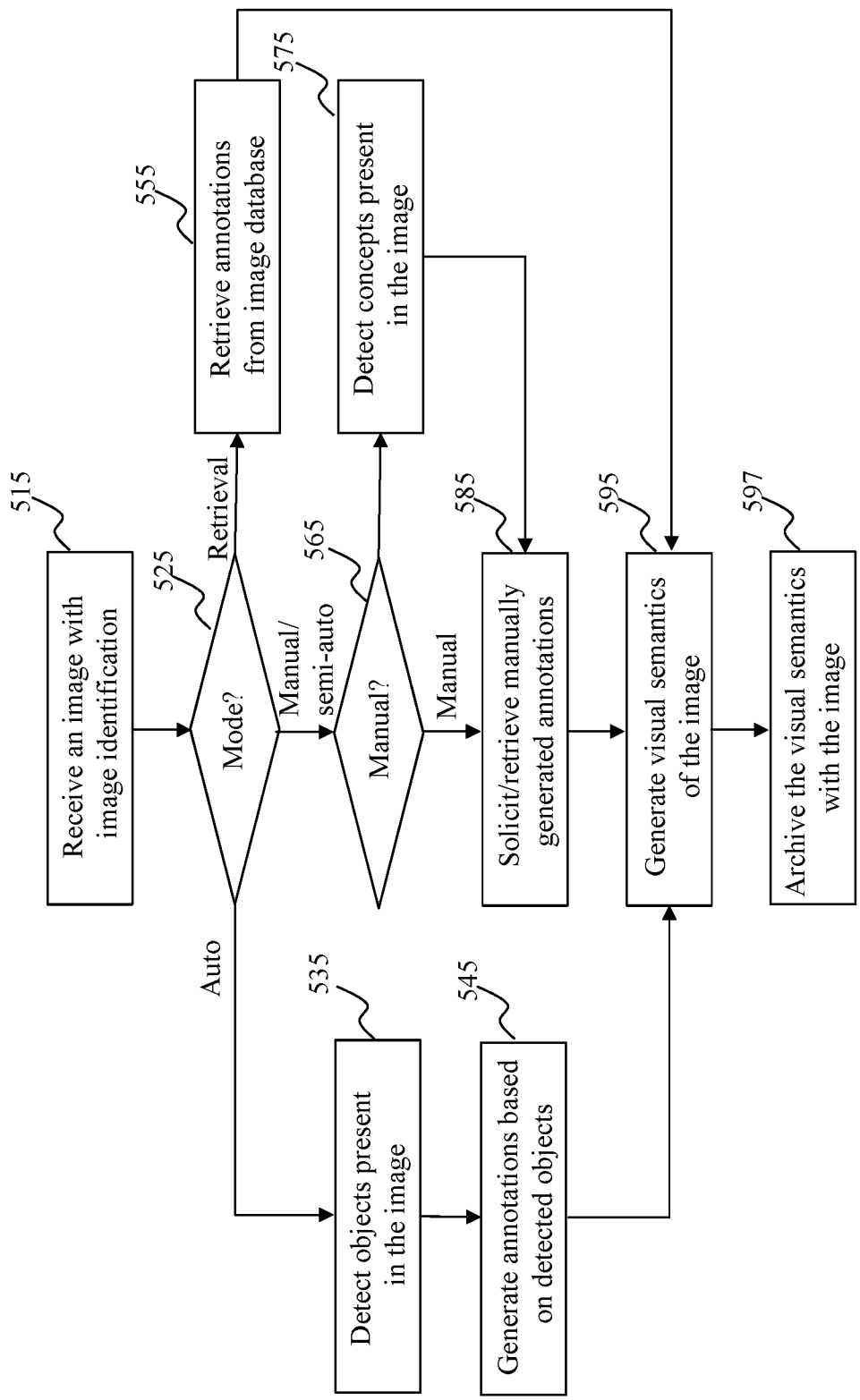
FIG. 5B is a flowchart of an exemplary process of a visual semantics generator, according to an embodiment of the present teaching.

In this illustrated embodiment, different ways to obtain annotations are enabled, including obtaining annotations automatically, manually, semi-automatically, and via retrieving pre-existing annotations. The visual semantics generation controller 510 is to control how to obtain annotations. Such control decisions may be made either via user control input or via operational configurations or set-up 505. FIG. 5B is a flowchart of an exemplary process of the visual semantics generator 120, according to an embodiment of the present teaching. An image is received first, at 515, by the visual semantics generation controller 510. The visual semantics generation controller 510 determines, at 525, which mode of operation is used to obtain annotations. If it is operated in an automatic mode, the operation proceeds to invoke the visual annotation unit 530 to detect, at 535, objects/features representing concepts from the image and generate, at 545, an annotation for each of the detected concepts. If the operation model is to retrieve pre-existing annotations, e.g., stored in the image database 160, the process proceeds to invoke the annotation retrieval unit 540 to retrieve, at 555, the pre-existing annotations for the input image. If the mode of operation is manual mode, determined, at 565, the process proceeds to invoke the annotation solicitation unit 520 to obtains, at 585, annotations from a user. If the mode of operation is semi-automatic, determined at 565, the process proceeds to invoke the visual concept annotation unit 530 which may then detects, at 575, objects/features representing concepts from the image based on, e.g., concept detection models 550. Such detected concepts may be assigned the initial annotations based on the models and then the annotation solicitation unit 520 may be invoked to solicit, at 585, user input to verify or confirm such automatically generated annotations of concepts. Annotations obtained in any of the alternative modes of operation may then be sent to the visual semantics generator 560 so that visual semantics for the image may be generated, at 595, and such generated visual semantics may then be archived, at 597, with the image.

Annotations of an image may or may not necessarily describe the scene as appeared in the image but may include annotations that provide an abstract summary of the visual components as appeared in the image. For example, annotation "orchestra" for the example shown in FIG. 3B is an abstract summary of the image even though there is no visual object or features present in the image is directly described by this annotation. Such abstract summary of the image makes it possible for machine learning to capture the relationship between visually co-occurring objects/features and abstract concepts that summarize the nature of an image. To learn such relationships, annotations encompassing both the concepts detected in the image and the concepts that are more abstract can be obtained via different modes of operation as disclosed herein. For some images, automatic, semi-automatic, and manual modes may all be applied (not shown in FIG. 5B) to obtain both annotations for visually visible objects/features as well as for abstract summary of what appear in the image.

Figure 6A:
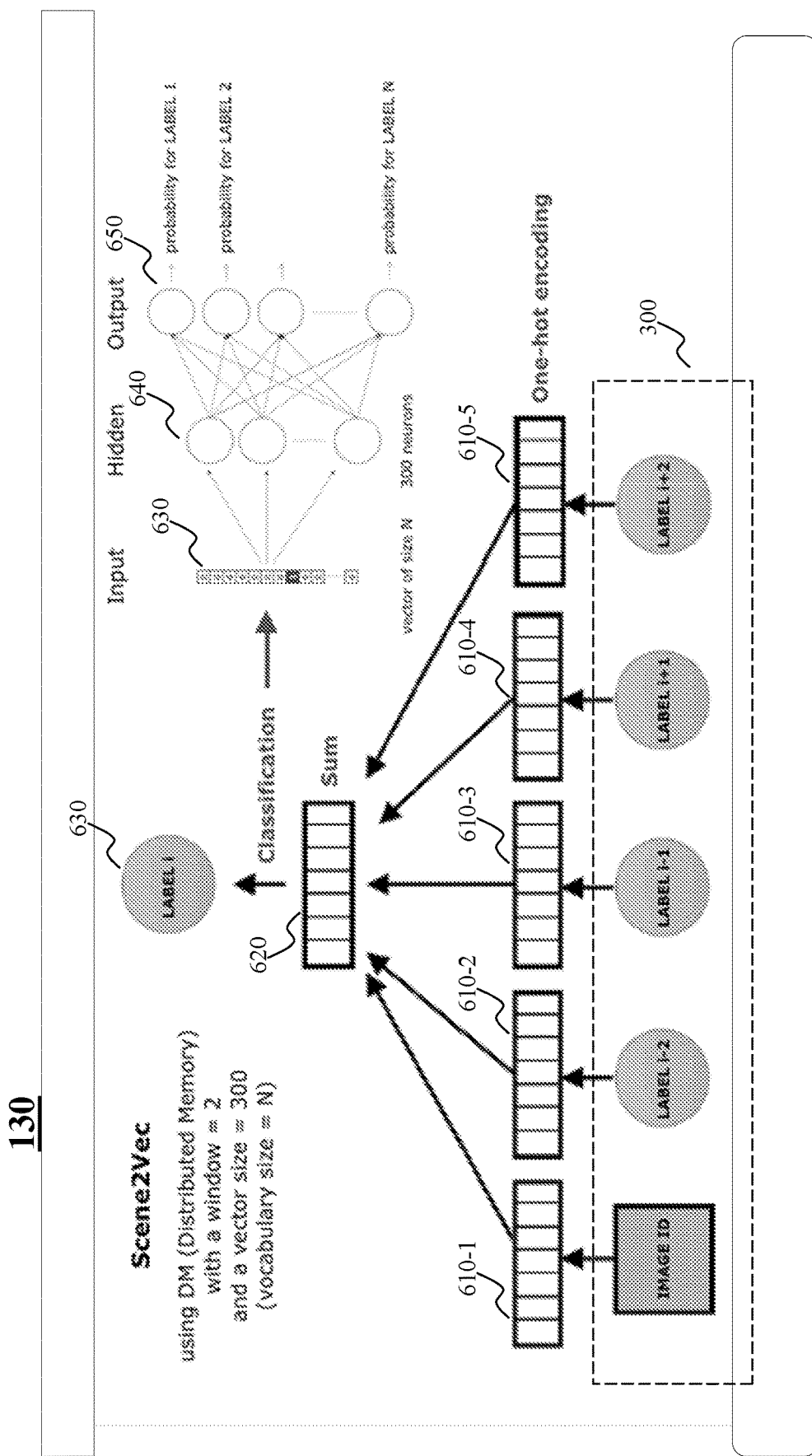
FIG. 6A depicts an exemplary high-level system diagram of an image scene embedding training unit, according to an embodiment of the present teaching.

FIG. 6A depicts an exemplary implementation of the visual semantic based embedding training unit 130, according to an embodiment of the present teaching. In this illustrated embodiment, input to the visual semantic based embedding training unit 130 is the visual semantics 300 of many images used for training. In some embodiments, each piece of content in the visual semantics, e.g., the image ID and each annotation, is mapped to a vector 610-1, 610-2, . . . , 610-3, 610-4, . . . , 610-5. Each annotation is mapped to a concept vector because each annotation represents a concept. An image ID is mapped to a document vector because an image provides a context to the annotation words. Such vectors may then be combined to generate a combined vector 620, which may be termed as a scene vector because it represents the scene of the entire image.

Via a machine learning process, the vectors (embeddings) for concepts and the images are learned by training or modifying parameters associated with the embeddings. To achieve that, during training, for each training image, one of the annotations for that image is chosen to be a target label that is to be predicted using the vectors of other annotations. Then existing embeddings associated with remaining annotations for that image may be used to predict a label. The goal is to deriving embeddings, via machine learning, so that such embeddings, when used, allows correct prediction of selected target labels. Thus, the training process is an unsupervised process.

For the same image used in training, it can be used as multiple pieces of training data during training. Each time when the same image is used for training, a different annotation may be chosen as target label. In this manner, vectors for different annotations may be iteratively modified to generate appropriate embeddings. When there is a large pool of training images, the embeddings can be adequately trained and derived so that, once they converge, they can be used predict concepts associated with images or to identify other images with similar concepts.

In FIG. 6A, when a target label is identified from the annotations of visual semantics of an image, the combined vector 620 is used to classify the image with respect to the target label. As shown in FIG. 6A, the combined vector 620 is used for such classification. In some embodiments, the classification may be implemented via an artificial neural network, as shown in FIG. 6A, with an input layer 630 (which may correspond to the combined vector 620), one or more hidden layers 640 (only one hidden layer is shown), and an output layer 650 with each node at the output layer corresponding to a target label. The output value at each node of the output layer may indicate a probability that the image represented by the input visual semantics corresponds to the label that the output node represents. In determining the predicted label, the output node that has the highest probability may be considered as the prediction, i.e., the predicted label is the label represented by the output node that presents the highest probability. When the predicted label does not match the selected target label, the discrepancy is used to feedback to adjust various parameters associated with the embeddings.

Figure 6B:
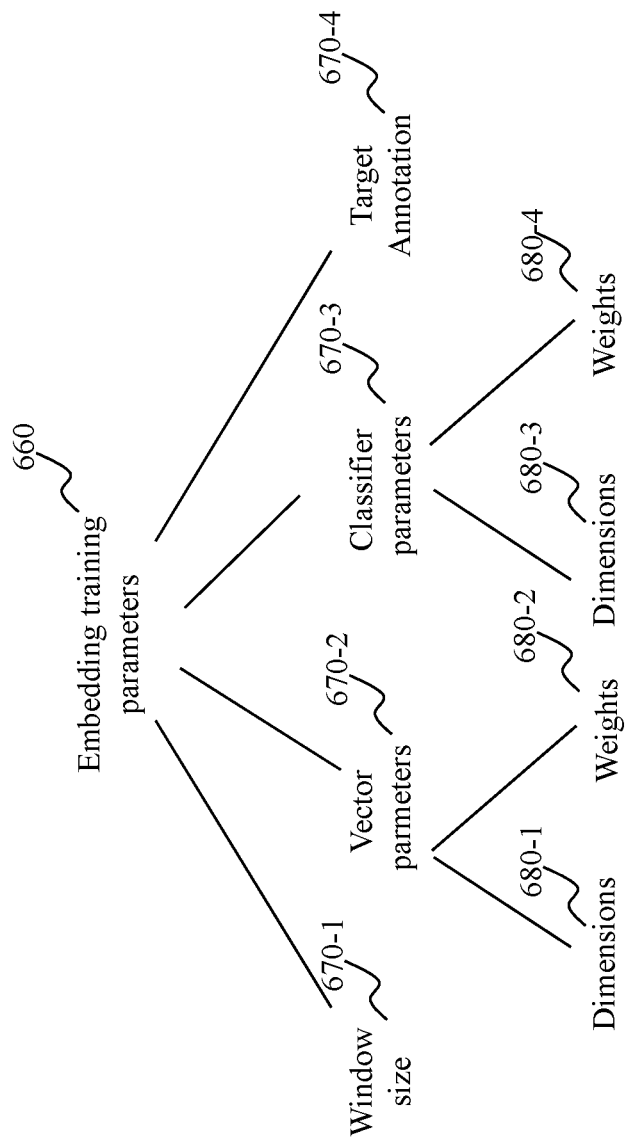
FIG. 6B illustrates exemplary types of parameters that are adjustable in image scene embedding training, according to an embodiment of the present teaching.

There are various parameters that may be modified during machine learning to obtain appropriate embeddings. FIG. 6B illustrates exemplary types of adjustable parameters in training scene embeddings, according to an embodiment of the present teaching. As illustrated, embedding training parameters 660 may involve parameters such as window size 660-1, vector related parameters 660-2, classifier related parameters 660-3, and the selected target labels or annotations 660-4. As disclosed herein, to achieve unsupervised learning, one of annotations associated with a training image may be selected each time as a target label so that prediction of this target label may be used as the basis to adjust the embedding parameters associated with, e.g., vectors or classifier. The target annotation 670-4 is related to how a target label is determined. For example, in some embodiments, a training scheme may require to alternately select one of the annotations as a selected target label for training. An alternative scheme may require to elect any annotation that is at an abstract summary level.

With respect to window size 670-1, it is related to the range of consecutive annotations that are to be considered with respect to a given annotation. This parameter may be implicated when a certain implementation approach is used. For instance, Word2Vec and Doc2Vec are existing available tools that can be used to convert words (annotations) or docs (image ID) into vectors. In using some of such tools, sequence of words may be important so that a window size may be selected within which the sequence of the words appearing in the window may be relevant. As annotations related to an image do not generally implicate a sequence, in using such existing tools where window size may be a parameter, a window size allowing all annotations within the window may be appropriate. Other choices may also be used and may be adjusted based on training requirements.

With respect to vector related parameters 670-2, they may include vector dimensions (680-1) as well as the weights (680-2) associated with each attribute of the vectors. For example, in converting each annotation into a vector, the vector dimension is a parameter. It may be 300, 500, or 1,000. Vector dimensions may be empirically determined based on application needs. The weights on each attribute of each vector can be adjusted based on training result.

With respect to classifier related parameters 670-3, it may include dimensions (680-3) (e.g., how many hidden layers, how many nodes on each layer, etc.) and weights (680-4) associated with, e.g., each node (e.g., the transformation function used for each node to transform from input signal to output signal) or each connection between nodes. In this context, the dimension parameters related to the classifier may be determiner empirically. The weights related parameters may be learned by iteratively modifying these parameters based on discrepancies between a predicted label and a selected target label.

Figure 7A:
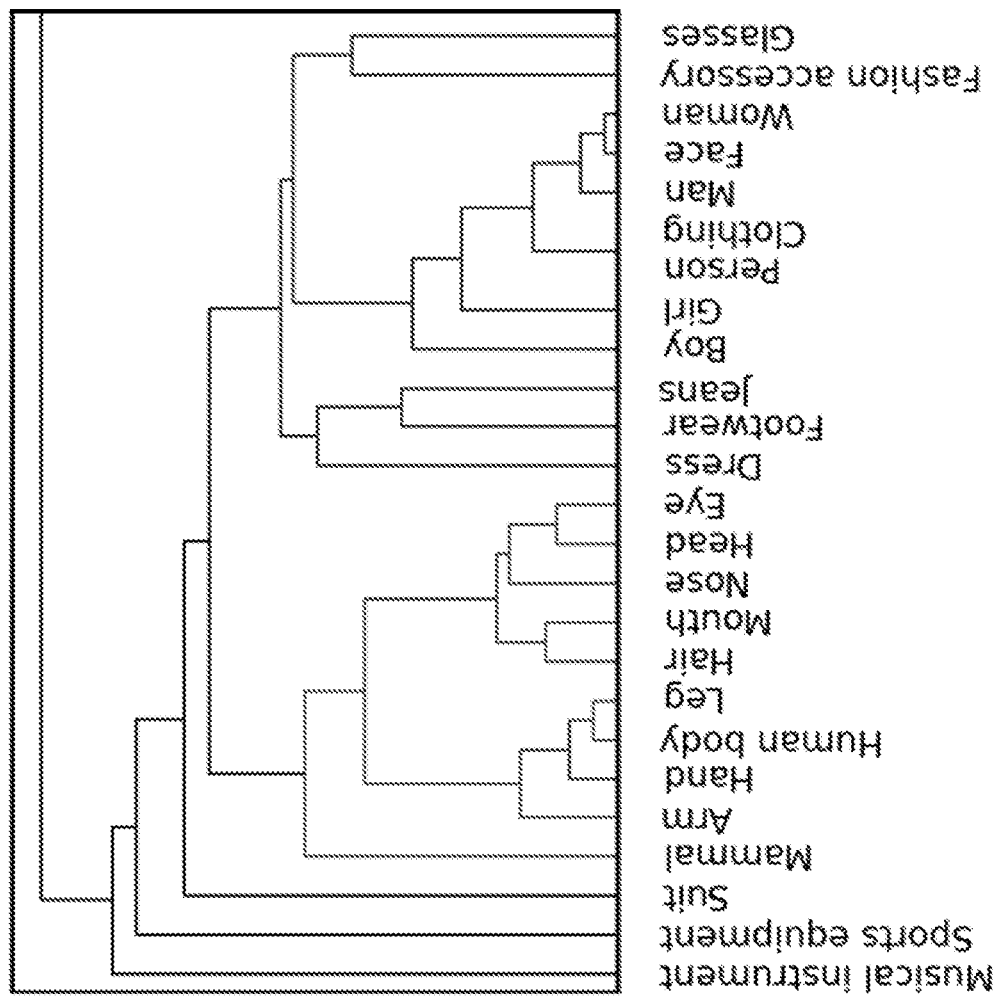
FIGS. 7A-7B show concept clusters generated based on learned image scene embeddings, according to embodiments of the present teaching.
Figure 7B:
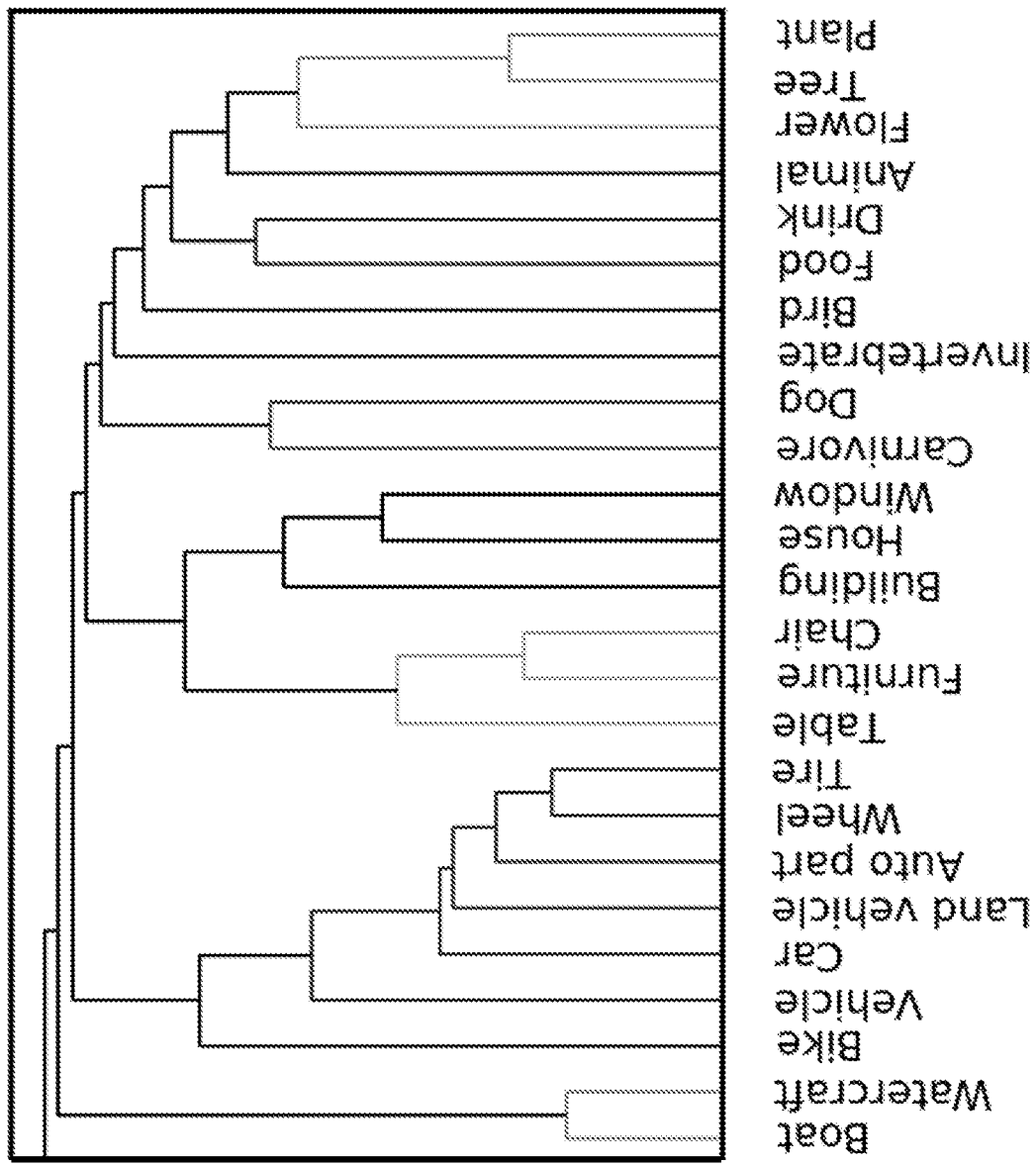

FIGS. 7A-7B show concept clusters represented by embeddings generated by learning from visual semantics of various images, according to embodiments of the present teaching. As can be seen, the learned concept clusters appropriately cluster similar concepts together and present hierarchical structures. For example, in FIG. 7A, arm, hand, human body, leg are clustered nearby, hair, mouth, nose, head, eye are clustered and together they form higher and higher level concepts such as mammal. Similarly, in FIG. 7B, concepts of tire, wheel, auto parts are grouped together and they are under the concept of vehicle which includes cars, land vehicles. Such derived embeddings are capable of abstraction, e.g., when annotations associated with an image include wheels and tires, through the concept hierarchy in FIG. 7B, it can be inferred that the image is related to vehicle because of collocated concepts of tires and wheels. In addition, if an image having annotation "cars" is presented to search for similar images, as "car" can be abstracted into the concept of "vehicle," similar images containing vehicles may be identified as search result which may include images with other types of land vehicles (as opposed to only images with cars).

Once the embeddings are trained via machine learning, they can be used to handle image related queries. Such queries may include the following. A user may present an image and ask for conceptually similar images. Such conceptually similar images may or may not exhibit similar low level visual features. For example, if a given image is a sunset image and the user asked for conceptually similar images. In this case, the embeddings of the query image may be used to match with embeddings of other sunset images that are conceptually considered as sunset images. Because sunset images exhibit similar low level visual features such as bright red colors, it is possible that similar images may also be identified using mere low level visual features may also (without the embeddings that capture the conceptual visual semantics of images). However, if a user queries, based on an image of a park, for similar park related images, as different parks have different landscapes or configurations (some park may have lakes and some don't, some parks pictures may have sky but some may not), low level visual feature based approach will not be able to appropriately respond to the query. In this case, the learned scene embeddings are capable of handling because the embeddings may have captured the salient conceptual level features such as collocated concepts, e.g., lawn, trees, and benches, etc.

Figure 8:
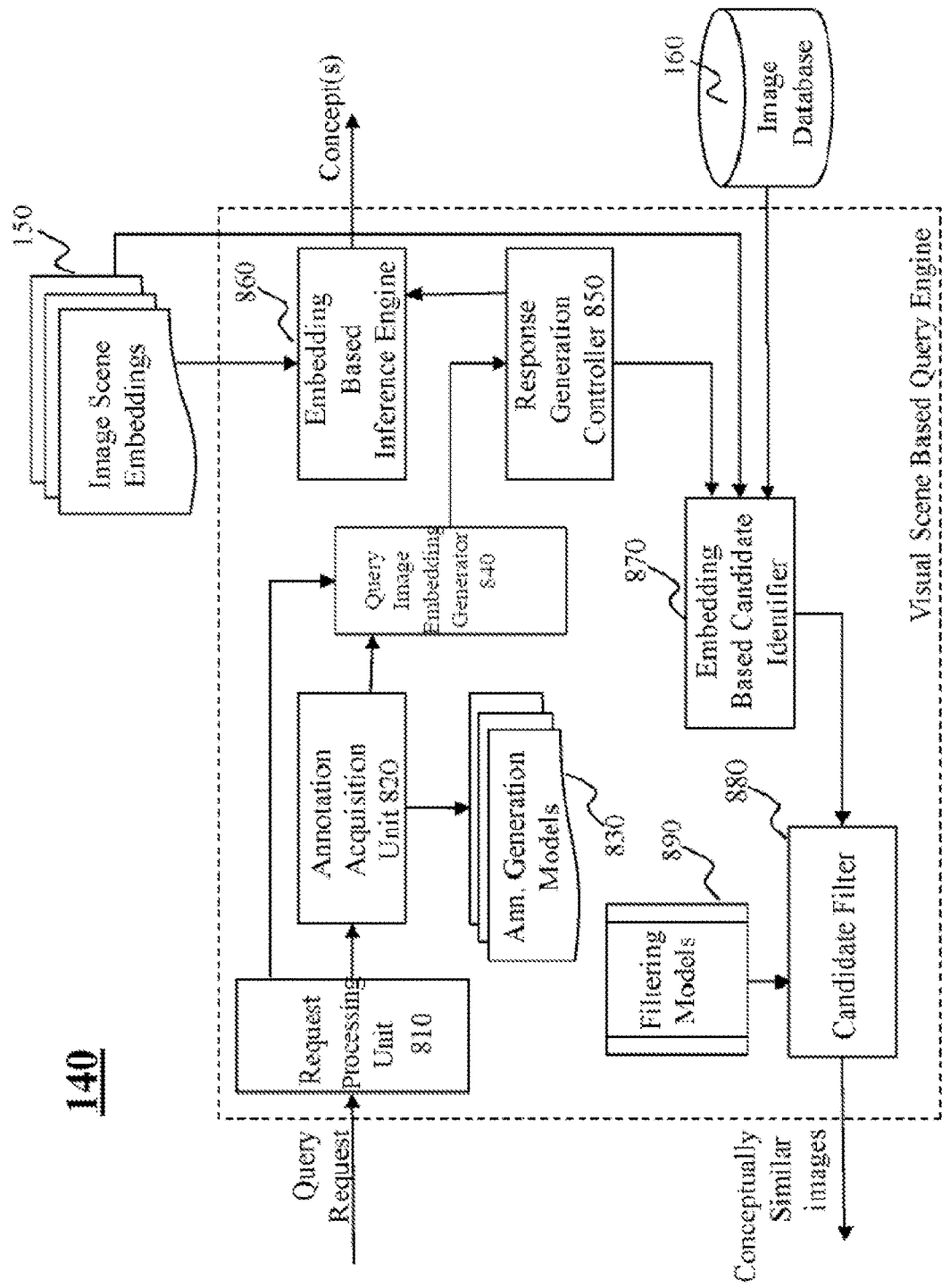
FIG. 8 depicts an exemplary high-level system diagram of a visual scene based query engine, according to an embodiment of the present teaching.

FIG. 8 depicts an exemplary high-level system diagram of the visual scene based query engine 140, according to an embodiment of the present teaching. As depicted in FIG. 1A, the visual scene based query engine 140 is for handling image related user queries based on scene embeddings generated via machine learning as disclosed herein. In this illustrated embodiment, the visual scene based query engine 140 comprises a request processing unit 810, an annotation acquisition unit 820, a visual semantic representation generator 840, a response generation controller 850, a visual semantics based inference engine 860, and a visual semantics based candidate identifier 870, and optionally a candidate filter 880.

The visual scene based query engine 140 is configured to handle image related queries. In the illustrated embodiment, two types of queries may be handled. The first type of query is to infer the concept or abstract summary of a given query image. For example, given an image including green lawn, trees, and benches, the user requests for an abstract summary of the image. The second type of query is to identify conceptually similar images. For instance, given an image including greed lawn, trees, and benches, the user requests to receive conceptually similar images. In this case, via embeddings learned via the present teaching, the annotations of lawns, trees, and benches (all concepts) associated with the query image may lead to the abstract summary of "park" for the query image and similar images related to "park" concept may be identified and returned as similar images. The visual scene based query engine 140 may handle an image related query where the query includes only annotations of concepts appearing in an image (without image itself), only an image (without annotations, which the visual scene based query engine 140 may derive during processing), or a combination of an image with its annotations.

Figure 9:
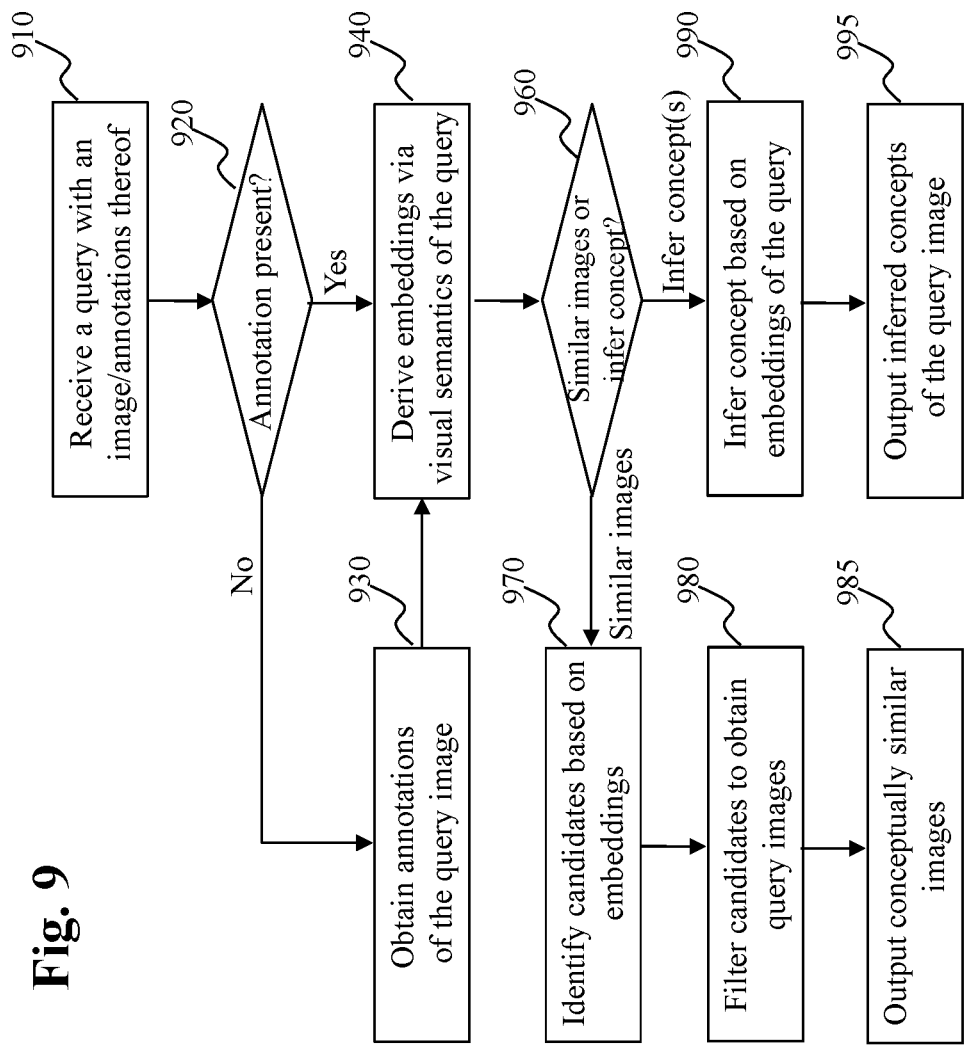
FIG. 9 is a flowchart of an exemplary process of a visual scene based query engine, according to an embodiment of the present teaching.

FIG. 9 is a flowchart of an exemplary process of the visual scene based query engine 140, according to an embodiment of the present teaching. When a query is received, at 910 by the request processing unit 810, it is determined, at 920, whether annotation(s) related to a query image is present. If any annotation is not provided with the query, the annotation acquisition unit 820 is invoked to obtain, at 930, annotations associated with the query image. Such annotations may be obtained manually from the user, automatically, or semi- automatically as disclosed herein. In automatically generating annotations, annotation generation models 830 may be used.

Once annotations of the query image are obtained, either from the query or by the annotation acquisition unit 820, the visual semantics (e.g., image ID and annotations) are established and used to derive, at 940 by the query image embedding generator 840, embeddings of the query image. Such embeddings of the query image capture the concepts (may include abstract summary or abstracted concepts) of the query image and enable the visual scene based query engine 140 to respond to the query based on machine learned embeddings. To do so, it is determined, at 960 by the response generation controller 850, the type of inquiry the query is about. If the query is to request for an abstract summary of an image (or concept(s) inferred from the given image), the embedding based inference engine 860 is invoked by the response generation controller 850 to infer, at 990, concepts from the visual semantics of the query image based on machine learned embeddings. Such inferred concepts of the query image are then output, at 995, by the embedding based inference engine 860.

If the query requests to identify conceptually similar images, the response generation controller 850 invokes the embedding based candidate identifier 870, which identifies, at 970, candidate similar images from the image database 160 based on the embeddings of the query image as well as the embeddings of the images in the image database 160. In some embodiments, such identified candidate similar images may be further filtered, at 980 by the candidate filter 880, based on some filtering models 890. Such identified conceptually similar images are then output, at 985, as a response to the image related query.

Figure 10:
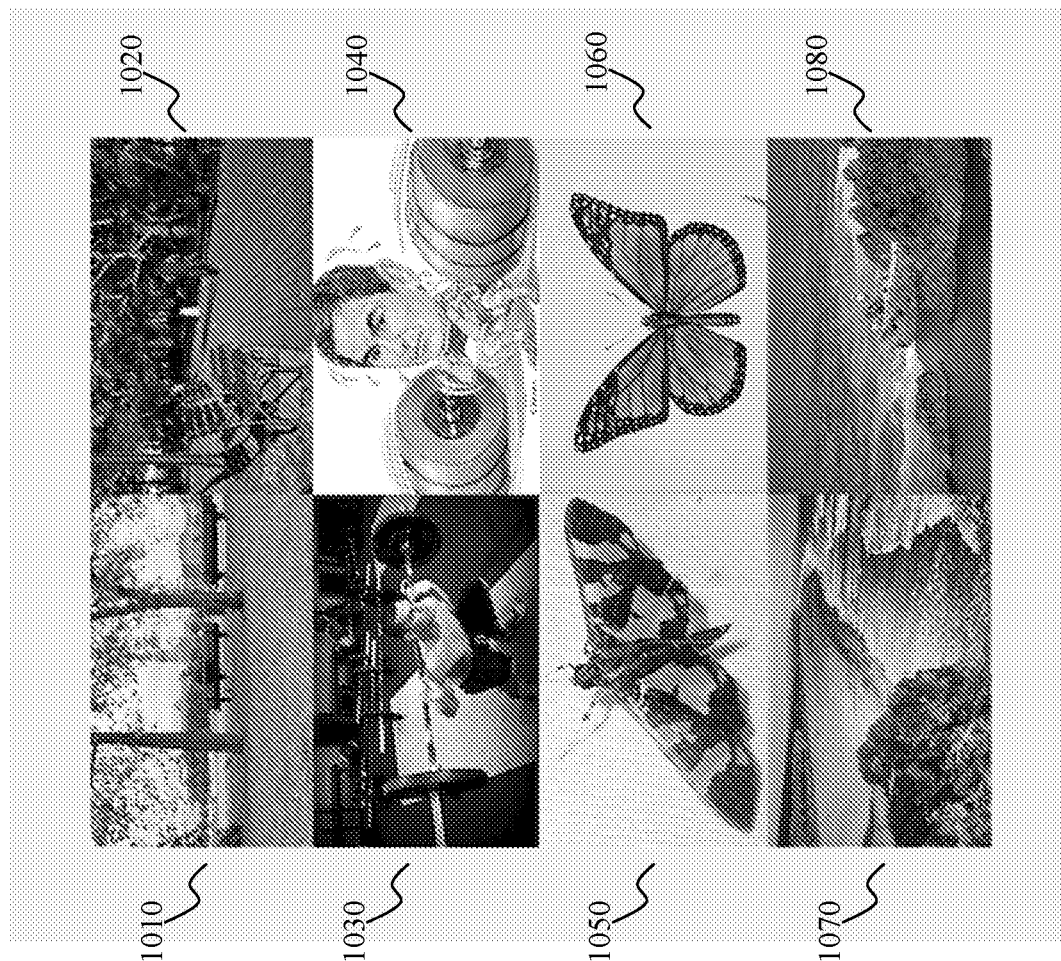
FIG. 10 shows visual scene query result generated based on machine learned visual scene embeddings, according to some embodiments of the present teaching.

FIG. 10 shows visual scene query result for conceptually similar images generated based on machine learned visual scene embeddings, according to some embodiments of the present teaching. There are 4 set of images illustrated, with each set including a query image and a conceptually similar image identified via machine learned embeddings. As shown, the first query image 1010 is a visual scene of a park, which includes sky, trees, lawn, benches, and some buildings. The query result 1020 obtained based on image 1010 via embeddings is an image of a different park with some trees, lawn, benches, and a person walking on the lawn (without sky and buildings). Although two images include some shared concepts (lawn, trees, benches), they also include different concepts as well (buildings, sky, person waling on the lawn). Despite the difference, the two images are considered conceptually similar and as can be seen they are indeed similar at a conceptual level that is higher than what is visible in the scene, especially higher than the traditional low level visual features (colors and texture).

Similarly, query image 1030 is a scene where someone appears to be exercising in a gym with weigh lifting. The queries conceptually similar image is 1040 which is a cartoon like image with a person and weights. Conceptually similar image is identified despite that there is nothing in the image suggesting a room or gym. Query image 1050 is a butterfly with big stripes of color patches. Compared with the conceptually similar image 1060, which is also an image with a butterfly, the two butterflies are successfully identified as conceptually similar even though they each present different color, different texture, and different shapes. Another set of result includes a query image 1070 of a scene along a beach with ocean water and rocks and a conceptually similar image 1080 identified via machine learned embeddings that is also a scene of a beach. Although both images have water and rocks, the specifically color, texture, and shape of components of the scene (water, sand, and rocks) certainly appear to be quite different, they nevertheless are identified as conceptually similar because both related to a beach scene.

Figure 11:
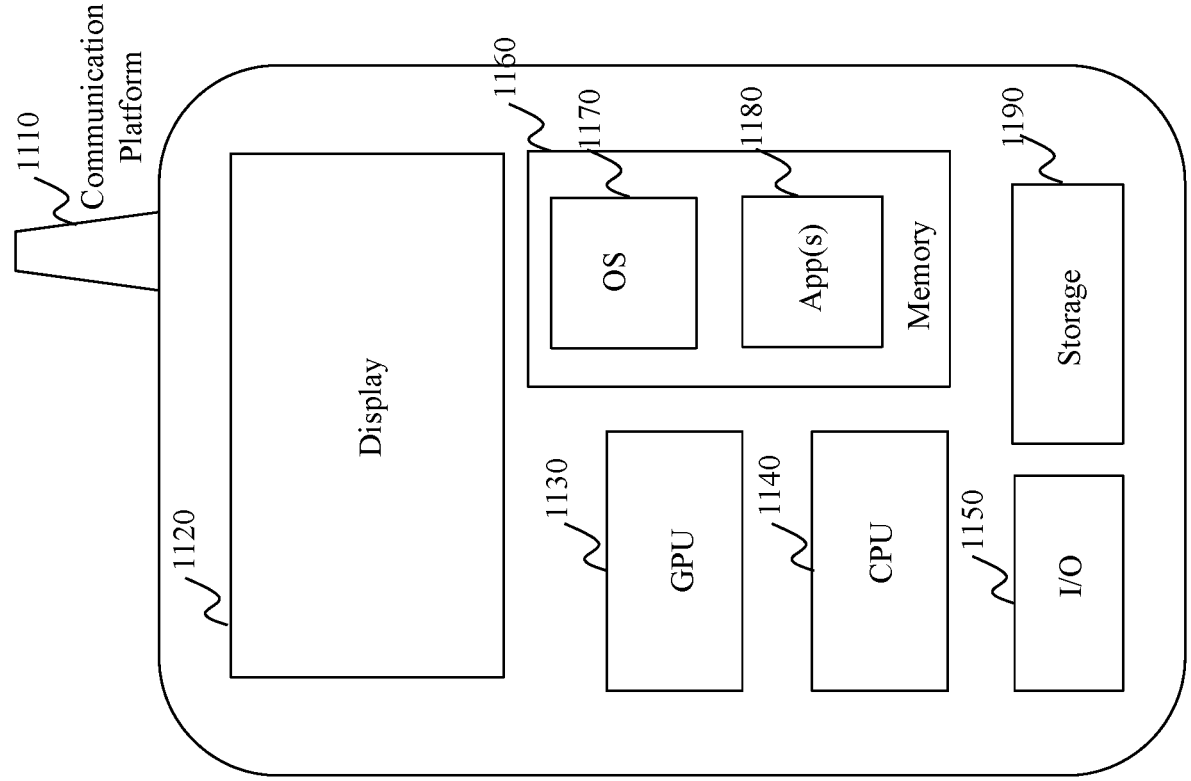
FIG. 11 depicts the architecture of a mobile device which can be used to implement a specialized system incorporating the present teaching.

FIG. 11 depicts the architecture of a mobile device which can be used to realize a specialized system, either partially or fully, implementing the present teaching. In this example, the user device on which content and advertisement are presented and interacted-with is a mobile device 1100, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1140. The applications 1180 may include a browser or any other suitable mobile apps for receiving and rendering content streams and advertisements on the mobile device 1100. Communications with the mobile device 1100 may be achieved via the I/O devices 1150.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to query to ads matching as disclosed herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
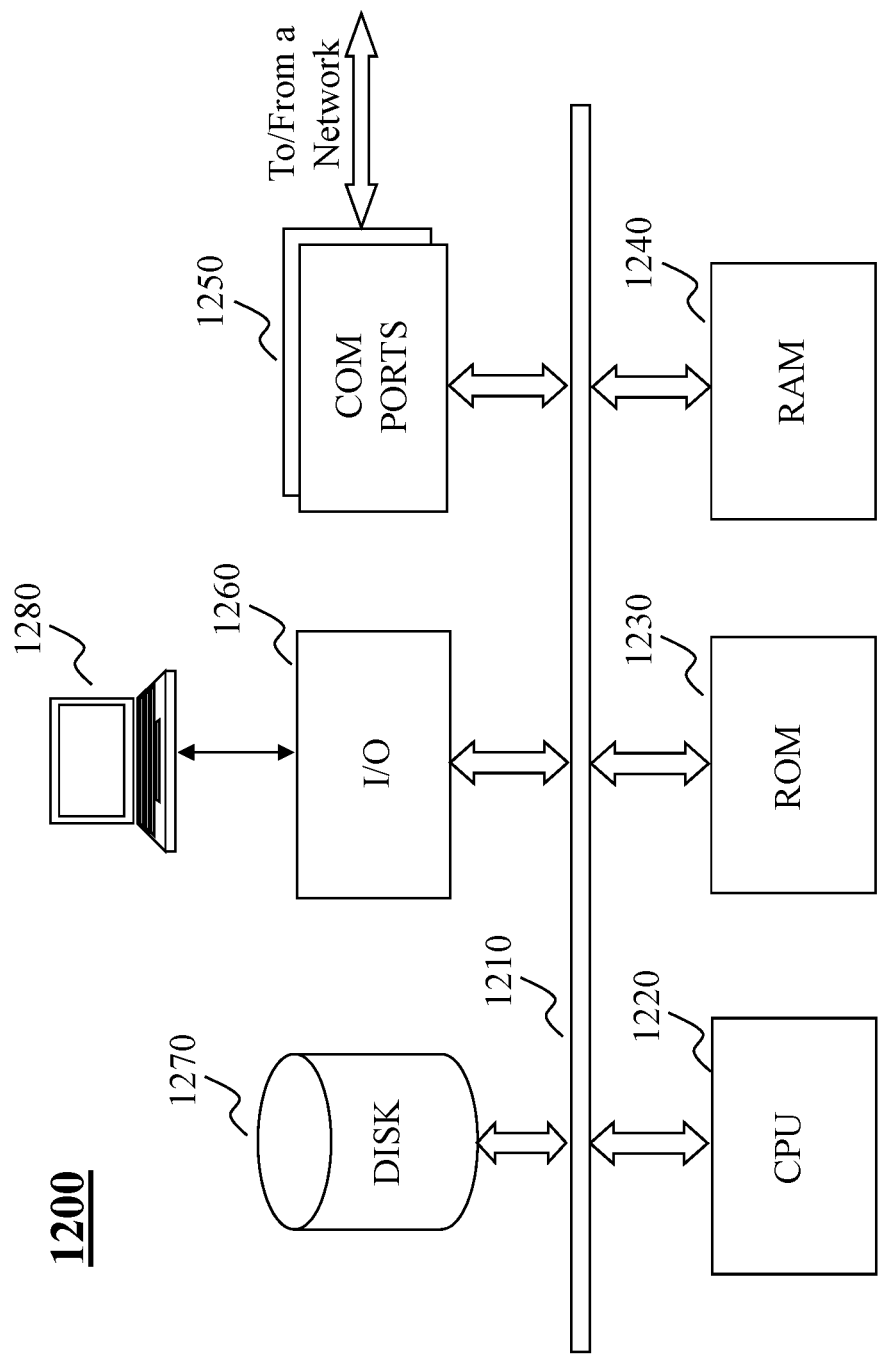
FIG. 12 depicts the architecture of a computer which can be used to implement a specialized system incorporating the present teaching.

FIG. 12 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1200 may be used to implement any component of the present teaching, as described herein. For example, the emotion-based ad selection engine 1270 may be implemented on a computer such as computer 1200, via its hardware, software program, firmware, or a combination thereof. Although only one such computer is shown, for convenience, the computer functions relating to the present teaching as described herein may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. The computer 800 also includes an I/O component 1260, supporting input/output flows between the computer and other components therein such as user interface elements 1280. The computer 1200 may also receive programming and data via network communications.

Hence, aspects of the methods of enhancing ad serving and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other systems into the hardware platform(s) of a computing environment or other system implementing a computing environment or similar functionalities in connection with query/ads matching. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced ad serving based on user curated native ads as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform for responding to an image related query for an image, comprising:
   receiving the image related query with an associated annotation;
   establishing, based on the annotation, visual semantics of the image, wherein the visual semantics of the image comprises a hierarchy of abstraction including a first level of abstraction naming a type of the image abstracted based on what are observed in an entire scene of the image and a second level of abstraction with a category name for each group of objects observed in the image, wherein the first level of abstraction does not directly describe any object in the image; and
   providing, based on the visual semantics, a response to the image related query.

2. The method of claim 1, wherein the annotation indicates concepts co-existing in the image.

3. The method of claim 1, further comprising:
   obtaining, based on the visual semantics of the image, a representation of the scene of the image, wherein the representation conceptually summarizes the scene based on spatial relationships among concepts co-existing in the image.

4. The method of claim 3, wherein the response is provided based on the representation of the scene of the image.

5. The method of claim 1, wherein the hierarchy further includes a third level of abstraction on each instance of each category of each object in the image.

6. The method of claim 5, wherein the first level is a top level of the hierarchy, the second level is an intermediate level of the of the hierarchy, and the third level is a low level of the of the hierarchy.

7. The method of claim 1, wherein the visual semantics of the image further comprises an identifier of the image providing a context of the visual semantics.

8. A non-transitory, computer-readable medium having information recorded thereon for responding to an image related query for an image, when read by at least one processor, effectuate operations comprising:
   receiving the image related query with an associated annotation;
   establishing, based on the annotation, visual semantics of the image, wherein the visual semantics of the image comprises a hierarchy of abstraction including a first level of abstraction naming a type of the image abstracted based on what are observed in an entire scene of the image and a second level of abstraction with a category name for each group of objects observed in the image, wherein the first level of abstraction does not directly describe any object in the image; and
   providing, based on the visual semantics, a response to the image related query.

9. The medium of claim 8, wherein the annotation indicates concepts co-existing in the image.

10. The medium of claim 8, wherein the operations further comprise:
    obtaining, based on the visual semantics of the image, a representation of the scene of the image, wherein the representation conceptually summarizes the scene based on spatial relationships among concepts co-existing in the image.

11. The medium of claim 10, wherein the response is provided based on the representation of the scene of the image.

12. The medium of claim 8, wherein the hierarchy further includes a third level of abstraction on each instance of each category of each object in the image.

13. The medium of claim 12, wherein the first level is a top level of the hierarchy, the second level is an intermediate level of the of the hierarchy, and the third level is a low level of the of the hierarchy.

14. The medium of claim 8, wherein the visual semantics of the image further comprises an identifier of the image providing a context of the visual semantics.

15. A system for online user profiling, the system comprising:
    memory storing computer program instructions; and
    one or more processors that, in response to executing the computer program instructions, effectuate operations comprising:
    receiving the image related query with an associated annotation;
    establishing, based on the annotation, visual semantics of the image, wherein the visual semantics of the image comprises a hierarchy of abstraction including a first level of abstraction naming a type of the image abstracted based on what are observed in an entire scene of the image and a second level of abstraction with a category name for each group of objects observed in the image, wherein the first level of abstraction does not directly describe any object in the image; and
    providing, based on the visual semantics, a response to the image related query.

16. The system of claim 15, wherein the annotation indicates concepts co-existing in the image.

17. The system of claim 15, wherein the operations further comprise:

obtaining, based on the visual semantics of the image, a representation of the scene of the image, wherein the representation conceptually summarizes the scene based on spatial relationships among concepts co-existing in the image.

18. The system of claim 17, wherein the response is provided based on the representation of the scene of the image.

19. The system of claim 15, wherein the hierarchy further includes a third level of abstraction on each instance of each category of each object in the image.

20. The system of claim 19, wherein the first level is a top level of the hierarchy, the second level is an intermediate level of the of the hierarchy, and the third level is a low level of the of the hierarchy.

\* \* \* \* \*